US008488067B2

(12) United States Patent
Candelore (10) Patent No.: US 8,488,067 B2
(45) Date of Patent: Jul. 16, 2013

(54) TV USE SIMULATION

(75) Inventor: Brant L. Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 12/913,025

(22) Filed: Oct. 27, 2010

(65) Prior Publication Data

US 2012/0105724 A1    May 3, 2012

(51) Int. Cl.
*H04N 5/44*    (2011.01)

(52) U.S. Cl.
USPC ............... 348/734; 340/390.16; 340/390.15; 340/515

(58) Field of Classification Search
USPC ............ 348/734, 725, 571, 522; 340/3.1, 340/4.4, 12, 2, 309.8, 309.15, 309.16, 515, 340/815.45, 691.6
See application file for complete search history.

(56) References Cited

U.S. PATENT DOCUMENTS

| | | | | |
|---|---|---|---|---|
| 4,970,489 A * | 11/1990 | Jenkins et al. | ............ | 340/309.8 |
| 5,252,947 A * | 10/1993 | Marciano | ...................... | 340/515 |
| 5,412,377 A * | 5/1995 | Evans et al. | .................. | 340/4.35 |
| 5,539,391 A | 7/1996 | Yuen | | |
| 6,097,520 A * | 8/2000 | Kadnier | ........................ | 398/106 |
| 6,516,421 B1 * | 2/2003 | Peters | ........................... | 713/502 |
| 6,781,638 B1 * | 8/2004 | Hayes | .......................... | 348/734 |
| 7,437,578 B2 | 10/2008 | Menzl | | |
| 7,671,735 B2 * | 3/2010 | Karaoguz et al. | ........ | 340/539.14 |
| 7,719,435 B2 * | 5/2010 | Readler et al. | ............ | 340/691.6 |
| 7,755,470 B2 * | 7/2010 | Readler | .................... | 340/309.16 |
| 8,063,772 B2 * | 11/2011 | Karaoguz et al. | ........ | 340/539.14 |
| 2009/0315752 A1 | 12/2009 | Bank et al. | | |
| 2010/0199312 A1 * | 8/2010 | Chang et al. | .................... | 725/46 |
| 2012/0050622 A1 * | 3/2012 | Smith et al. | ................... | 348/734 |

OTHER PUBLICATIONS

Anonymous, "TV Timer," Shomer-Tec website, 2010.
Anonymous, "TV Attacker," Shomer-Tec website, 2010.
Anonymous, "TV Simulator," Shomer-Tec website, 2010.

* cited by examiner

*Primary Examiner* — Paulos M Natnael
(74) *Attorney, Agent, or Firm* — Miller Patent Services; Jerry A. Miller (57) ABSTRACT

A method of simulating use of a television consistent with certain implementations of the present invention involves switching a television remote controller or a television STB to an operational mode in which a simulating function is activated. While in the simulating function is activated, the television receiver device is operated in a manner which to simulates operations that a user performs when using the television receiver device by changing operation at scheduled times, random times or random time intervals. This abstract is not to be considered limiting, since other embodiments may deviate from the features described in this abstract.

16 Claims, 5 Drawing Sheets

TV USE SIMULATION

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Thieves are generally less likely to break into a home which appears to be vacant or unoccupied. However, even if a house has an alarm system, thieves can be in and out of a house before anyone, e.g. police or neighbors, can respond. Thieves are less likely to do home invasions where someone is present in the household. They prefer the home to be vacant. So it is advantageous to prevent a break-in in the first place rather than to simply sound an alarm after it is too late to effectively respond.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As noted above, it is preferable to make a vacant house appear to be lived-in and occupied in order to dissuade thieves from targeting the home for a burglary. In certain implementations of embodiments consistent with the invention, the television (TV) is caused to turn on/off according to a schedule, a programmed time (e.g., a factory preprogrammed default schedule) or in a randomized manner.

In the past, simple plug-in timers could be used to cause an analog TV to turn on or off (only), but current LCD/Plasma/LED TVs etc., cannot generally be turned-on via ordinary timers used on power lines, e.g. those that are normally connected to lights. This is because the TV is not actually turned "off" by conventional remote controls. Instead, they are placed in a low power standby mode in order to await a remote control command or a press of a button on the front/side panel to "wake up". So the user's perception is that the TV is off, but in fact it is simply in a standby or sleep mode waiting to be awakened. The same could be said of set-top boxes connected to the TV and many other audio/video (A/V) devices.

In certain implementations, a TV timer consistent with certain embodiments can be implemented by an enhanced TV remote control (RC) or TV Universal Remote Control (URC) or by the set-top box (STB) connected to a TV, or the TV itself. The URC allows the feature to be used with all TVs and set-top boxes. Or the feature can be implemented in the User Interface of a set-top box and/or TV to allow the TV display to be turned on/off and tuned to content according to a schedule. In addition to tuning content, real or simulated menu displays and selection could be made as if a viewer were actually making selections from the OSDs. In addition, the loudness of the TV could be adjusted occasionally showing the changing number of bars for audio in the On-Screen Display OSD. This would simulate a viewer not only watching the TV, but actively using the URC. For purposes of this document, the terms remote control and universal remote control may be used interchangeably and will be understood in context. It will further be understood that a URC may be a RC that is generally dedicated to use for, for example, a TV but is also capable of controlling other devices such as a STB or other devices often connected to a TV.

Some set-top boxes and TVs are able to get content from the Internet. Hence, the term "tuning" is being used broadly to include reception of content through an IP connection.

Since in many households, the TV can be seen from the street through windows or the front door, and may also be audible from close proximity. Thus, by periodic changes in operation of the TV, a break-in might be deterred when a potential thief believes that the house is occupied on the basis of changing operation of the TV.

In accord with certain implementations, the TV is turned on/off according to a schedule or in a random manner in unattended operation. This may be accomplished by a Remote Control or by the TV user interface with a timer function. Many TV sets are driven by a set-top box, and so the set-top box may be driven as well—to turn on and tune a specific channel. Ideally, the TV would not display a screen saver from the set-top box. Hence, discussions herein with regard to operation of a TV by a remote control or under programmed operation of the TV itself can be readily translated to control of any part of the TV receiver system including a set top box without limitation, and implementations consistent with the present invention may be embodied within any suitable remote controller or television receiver device including set top boxes without limitation. So, for purposes of the present discussion any device that receives TV programming including television sets and set top boxes can be considered to be within the definition of a television receiver device without limitation.

In one implementation, a clock/calendar is added to a RC or TV user interface so that it can toggle the TV on/off while the owner is away. The RC can drive both the TV and set-top box as well. Likewise, the TV user interface can drive the TV display and an external set-top box if need be, for example through the use of an Infrared (IR) "blaster" hooked up to a port on the TV. If external control is not desired or possible, every once and a while menus can be driven on screen or content can be driven from external (e.g., USB2) flash memory or memory stick. Use of a stored content from local storage media, e.g. flash memory, could preclude the need to operate the external set-top box. It is also possible to simulate the OSDs and operation of the set-top box or TV through playback of the content. For example, the content could display an electronic program guide (EPG) as part of the content rendered in the display and not as graphics generated by the set-top box or TV. This would simulate the watching of a program by a viewer at home. As used herein, the term television receiver device is intended to include both TV and STB individually or collectively.

Currently in order to save space on the RC, a power toggle function is used instead of a separate button for "power off" and "power on". The button on the remote control is actually "toggle power". If the set-top box or TV is "on", it will turn "off". If the set-top box or TV is "off", it will turn "on". However, it would be preferable to find the remote control code for the explicit "power off" command and explicit "power on" command. Many devices will respond to special codes for these commands. They are often used in automated testing scenarios or as a way to get directly to a particular screen without having to drill through a long menu list on-screen. That way TV operation can be more precisely controlled. The power handling routine will not get out-of-sync with actual operation of the TV. The same could be done with the set-top box if it needs to be driven as well.

It is also possible for a television operating under control of a programmed processor to be processed to detect whether or not a signal is being driven into the TV set to activate the display. After being left on for a certain amount of time without a signal, the display can be deactivated. A television such as this would not necessarily require a "power on" command since detection of a driven signal would accomplish the same thing. Deactivation of the display would be accomplished through a timer. If no signal is present after a certain amount of time, e.g. 20 minutes, the TV display is shut-off.

Figure 1:
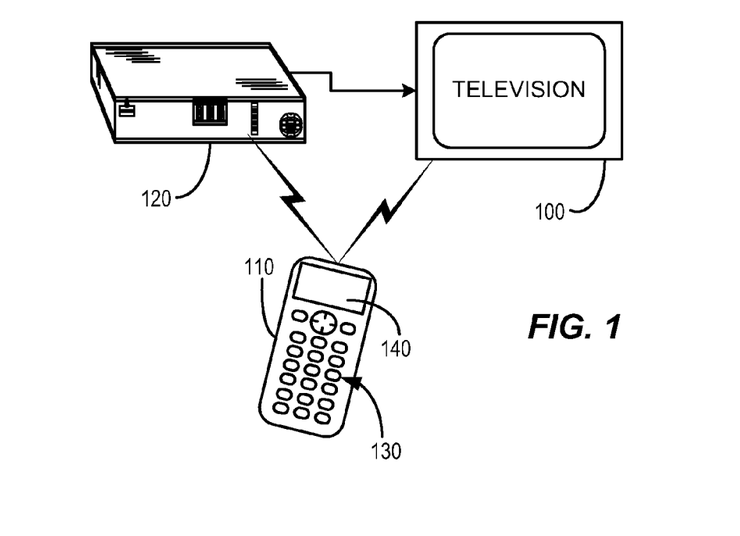
FIG. 1 is a diagram of an example TV system consistent with certain embodiments of the present invention.

In accord with certain example implementations, in FIG. 1 a television set 100 (which may be fed by a television set top box (STB) 120) 100 is controlled by a remote control 110. In one implementation, the television set 100 includes internal circuitry that permits scheduling or randomized operation that simulates use of the TV by a user. In another implementation, the RC 110 incorporates internal circuitry that simulates use of the TV 100 using the RC 110, which may control the TV 100 and/or the STB 120. The RC 110 can change channels, volume and display OSD and menu functions such as a channel guide on a scheduled, programmed (e.g., a factory pre-programmed default schedule) or random basis in order to simulate a user being at home. The RC 110 generally has a keypad 130 serving as a user interface and may have its own display 140 further serving as part of the user interface in order to permit the user to program a schedule using the RC 110.

It will be understood by those skilled in the art upon consideration of the present teachings that the remote control 110 can be programmed to control any of the television receiver devices (100 or 120 in this example) or both so as to simulate operation of the television (as perceived by someone viewing in an attempt to determine if it is safer to break in) by a human. So, RC 110 can be programmed to control either 100, 120 or both to accomplish this end result. By way of example, channel tuning commands and display of a program guide may be directed to the STB 120 while TV menu commands and volume control commands may be directed to the television set 100.

Figure 2:
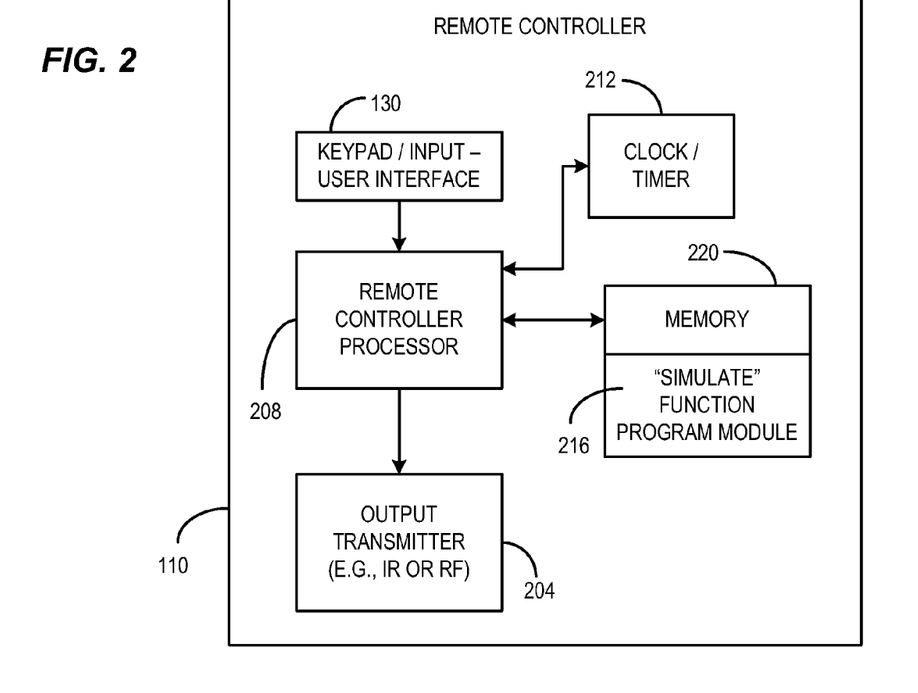
FIG. 2 is an example of an implementation of a block diagram of a remote controller device consistent with certain embodiments of the present invention.

Referring now to FIG. 2 in conjunction with FIG. 1, an example of an implementation of a remote controller 110 which controls a television receiver device such as 100, 120 or both is shown. The remote controller 110 has user interface 130 that receives user commands. A transmitter 204 transmits commands for receipt by the television receiver device 100 or 120. The RC 110 has a processor 208 (either hard wired or programmable CPU or combination thereof) that processes user commands that control a television receiver device. The processor 208 switches the television remote controller 110 to an operational mode in which a simulating function is activated upon receipt of a corresponding user command via the user interface 130. While in the simulating function is activated, the processor 208 causes the transmitter 204 to transmit commands from the remote controller 110 in order to simulate operations that a user performs when using the television receiver device. The transmitting of commands can includes transmitting commands at scheduled times, random times or random time intervals. The commands transmitted can be based on times, dates etc. as determined by a clock/timer 212. The simulation function can be a program module such as 216 stored in a memory 220 coupled to processor 208.

Among other possible commands that can be implemented, the RC 110 can transmit commands that: turn the television receiver device or a portion thereof off and on, change tuned television channel, display on-screen-display or menu functions, change audio volume levels.

The commands can be transmitted at scheduled times that are user programmed or can be generated at random and are sent at random times. Any of the above commands can be directed to either the TV 100 or STB 120 or both depending upon operation of the system at hand.

Figure 3:
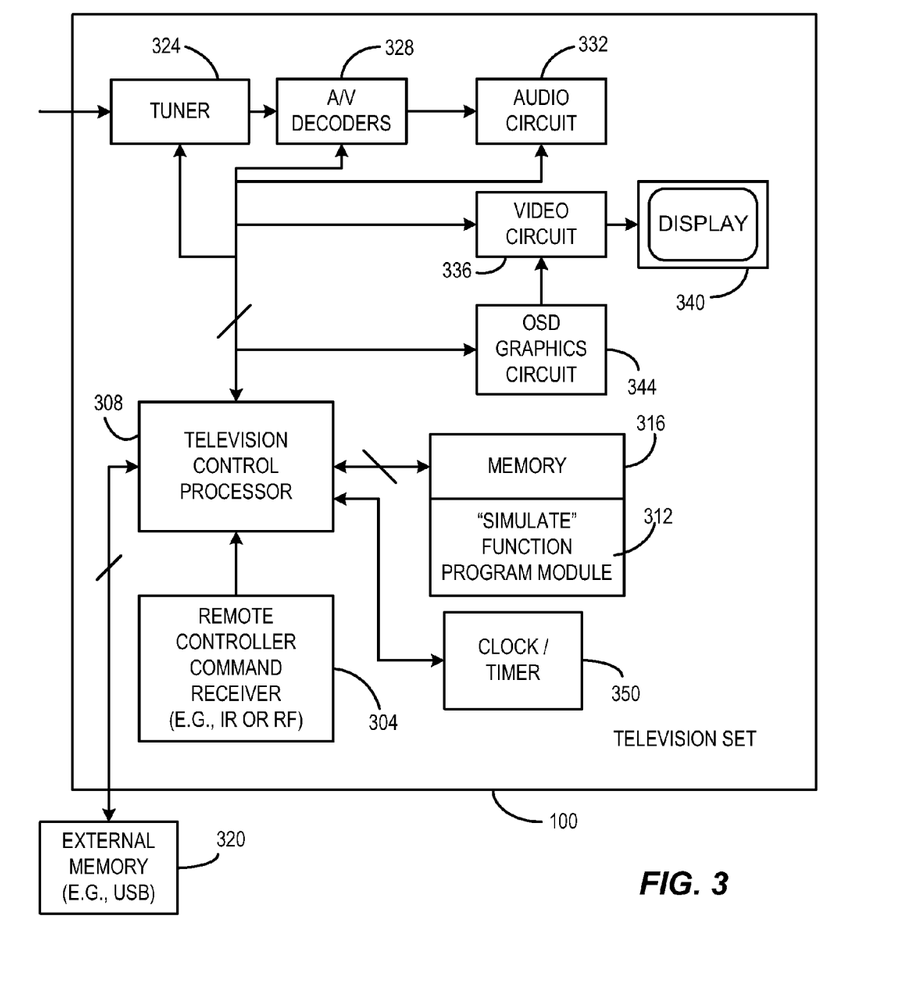
FIG. 3 is an example of an implementation of a block diagram of an example television set consistent with certain embodiments of the present invention.

Referring now to FIG. 3, an example television set 100 implementation is depicted. Those skilled in the art will appreciate that a comparable implementation can be carried out within a television STB such as 120 to control STB functions without departing from embodiments consistent with the present invention.

A television receiver device 100 has a user interface such as a remote controller command receiver 304 that receives user commands. The television's control processor 308 processes user commands from 304 that control the television receiver device 100. The processor can switch the television receiver device 100 into an operational mode in which a simulating function is activated upon receipt of a corresponding user command via 304. The simulating function can be a part of a simulation functional program module 312 stored in internal memory 316 and/or may operate in conjunction with an external memory device such as a USB memory device 320. While the simulating function is activated, the processor causing the television receiver device to operate in a mode that simulates operations that a user performs when using the television receiver device 100. While in the mode that simulates operations that a user performs, the operations can be carried out either at scheduled times, programmed times (e.g., a factory pre-programmed default schedule) random times or random time intervals.

The television receiver device 100 may have a tuner 324 that receives incoming TV signals and tunes to a channel determined by the control processor. This tuned channel is decoded by A/V decoders 328 to produce audio signals for audio circuit 332 and video signals for vide circuit 336 which drives a display 340. An OSD graphics circuit 344 generates menus and other displays such as volume graph sliders and the like also operates under control of processor 308 which is combined with the video at video circuit 336 to produce on screen graphics displayed at display 340. A clock/timer circuit 350 generates clock information for the processor for use in carrying out timed operations according to the simulation program functionality controlled by 312.

As with the RC implementation, the operations can include turning the television receiver device or a portion thereof off and on, changing a tuned television channel, displaying an on-screen-display or menu, and/or changing audio volume levels.

The operations can be carried out at scheduled times, and the scheduled times and associated operations are user programmed or the commands are selected and carried out at random times.

Figure 4:
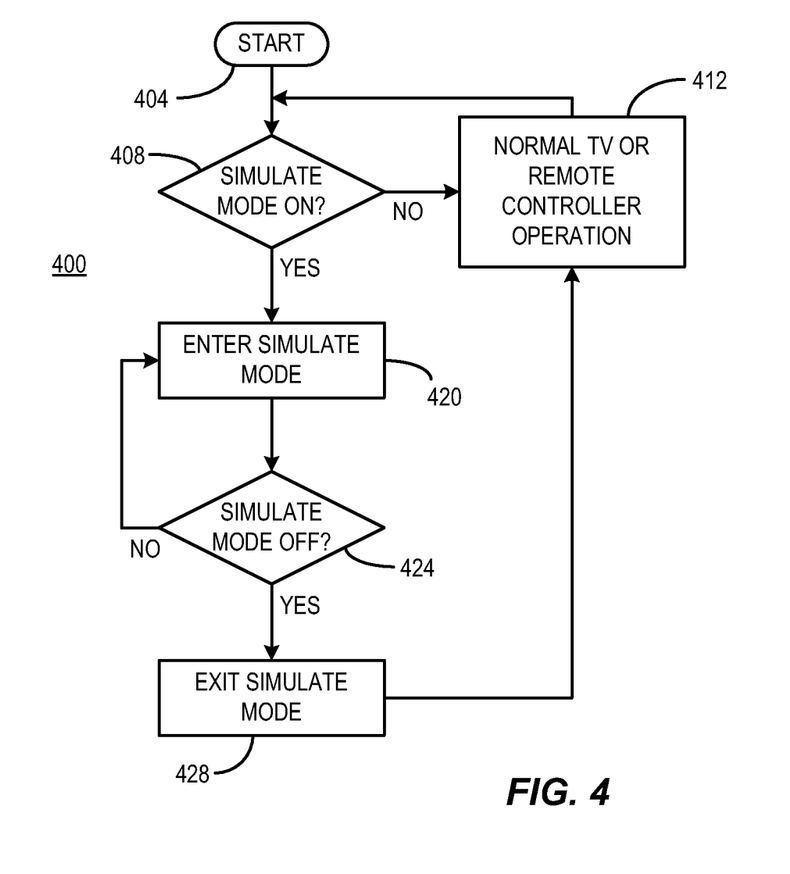
FIG. 4 is an example process consistent with certain embodiments of the present invention.

The simulation processes carried out in the devices described above can be carried activated and deactivated using an appropriate user interface (including an integral TV interface device on TV receiver device 100) whether the process is programmed for operation by the remote controller 110 or by the television receiver device 100 using the example process 400 of FIG. 4. The process starts at 404 after which if the simulation mode is not turned on at 408, the TV operates in a conventional manner at 412 until the simulation mode is turned on at 408 at which point the simulation routine is entered at 420.

Once in the simulation mode, the television receiver device 100 is controlled either internally or via an external source such as remote controller 110 or an external memory module to operate in the simulation mode until a user command causes the simulation mode to turn off at 424 at which point the simulation mode is exited at 428.

So, in accord with process 400, in one implementation, the user switches a television remote controller to an operational mode in which a simulating function is activated at 408. While in the simulating function is activated at 420, the RC sends commands to a television receiver device in order to simulate operations that a user performs when using the television, where sending commands includes sending commands at scheduled times, random times or random time intervals.

And in another implementation, a television receiver device is switched to an operational mode in which a simulating function is activated at 408. While the simulating function is activated at 420, the TV receiver device simulates operations that a user performs when using the television receiver device. The simulated operations include operations carried out at scheduled times, random times or random time intervals.

Figure 5:
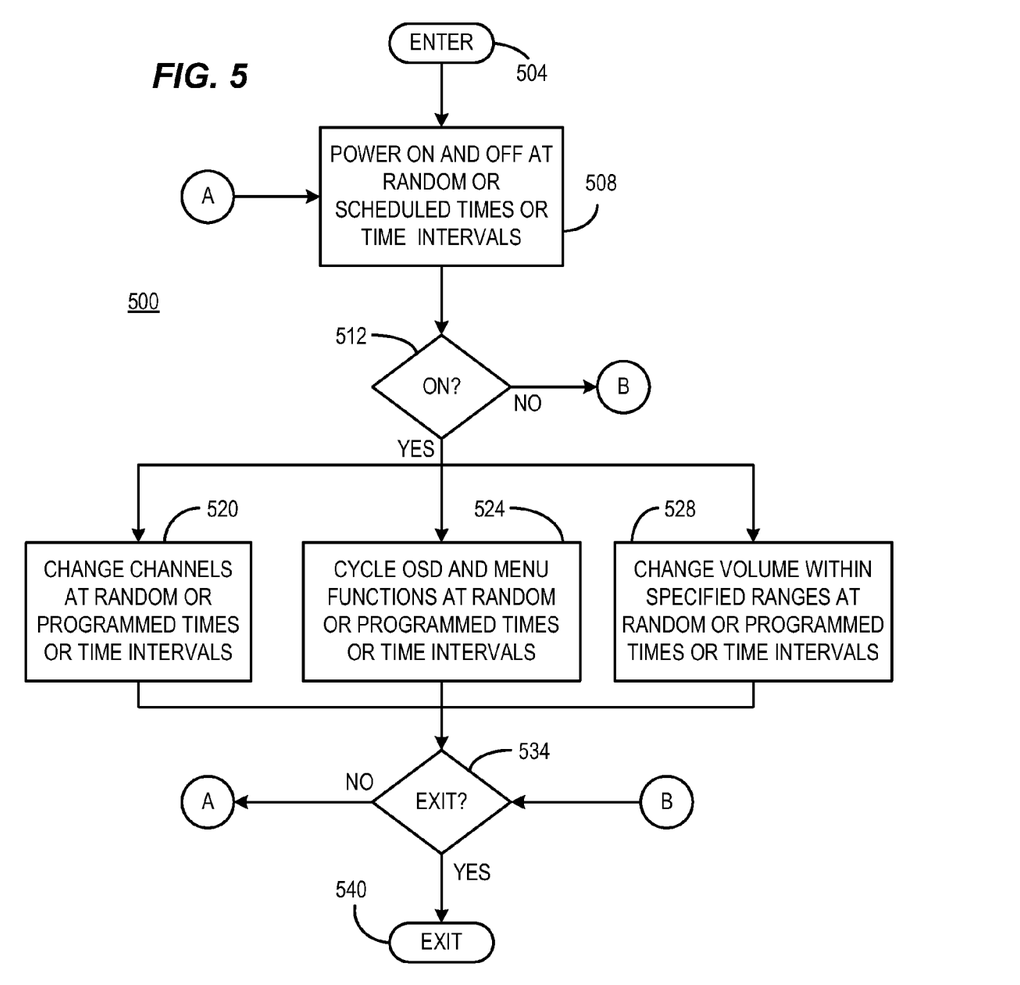
FIG. 5 is an example of a process consistent with certain embodiments of the present invention.

The simulation process can be carried out in any number of ways. FIG. 5 shows a process 500 depicting but one of many possible examples of a mechanism for carrying out the simulation. The routine is entered at 504 after which the power is cycled on and off at random or scheduled time intervals at 508. During the times that the TV is "on" (i.e., powered up and not in the standby mode) at 512, any of several actions can take place in a scheduled or random fashion. These actions are shown in parallel, but this is intended to depict that any of one or more of the actions can be implemented at any given time. So, at 520 the channels can be changed, at 524 the OSD and menu displays can be changed and at 528 the volume can be changed—possibly within specified boundaries. Any of these actions can be programmed to take place at particular times, time intervals or randomly.

Scheduled, or predefined programs, can be set up to run on a daily, by date, weekly, or monthly schedule as desired by the designer of any particular implementation, or the simulation can be generated using random or semi-random or learned behavior taken from noting a particular user's viewing habits. At any time during the simulation process, the routine may be commanded to exit at 534 resulting in termination of the simulation and exit of the routine at 540.

Figure 6:
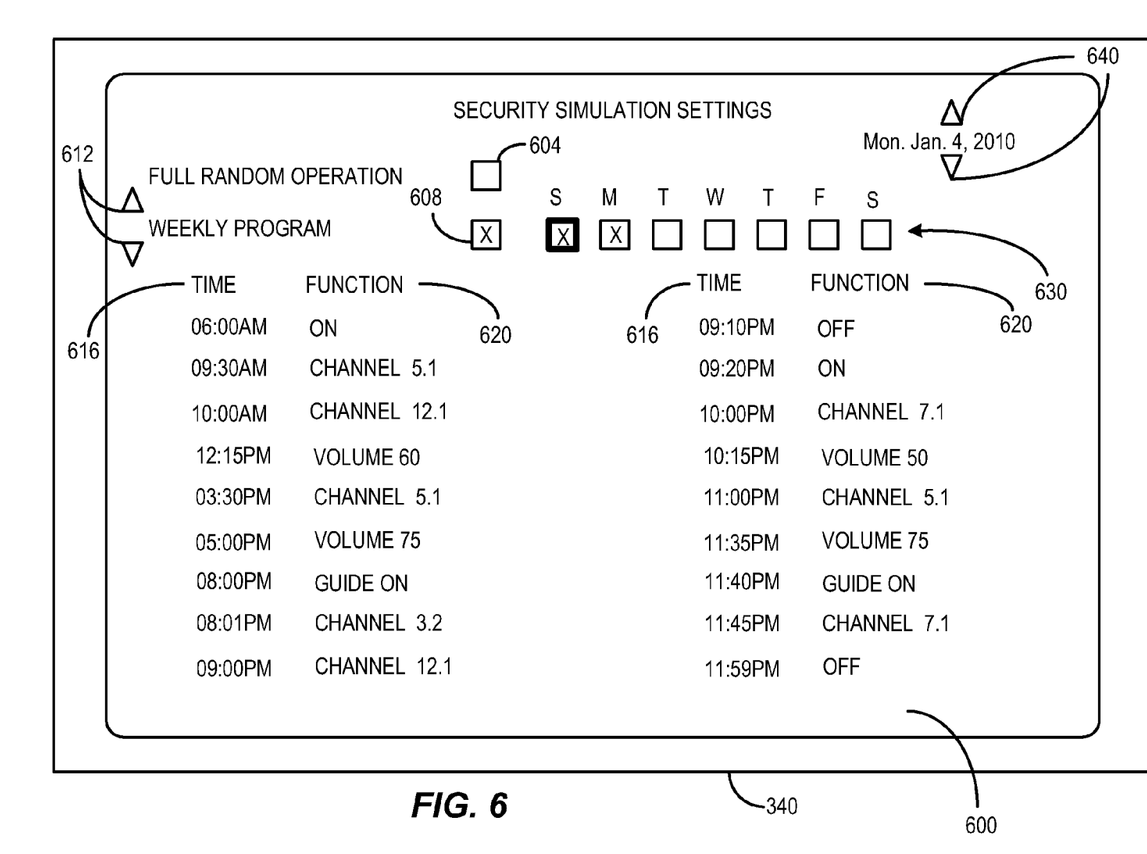
FIG. 6 is an example of an implementation of a simulation scheduling interface consistent with certain embodiments of the present invention.

In one example implementation, a scheduling screen 600 of FIG. 6 can be summoned by use of the remote controller 110, for example as an icon on a cross media bar (XMB) style menu system to enter scheduling information for use by the simulation routine. In this example, the user can select block 604 using the navigation keys of the remote control for example, to have full random operation in which the TV simulation routine selects the event changes at a random, semi-random, learned or pre-programmed manner. Alternatively, at 608, the user can elect to establish a daily, weekly, monthly, etc. program. The arrow icons 612 can be used to cycle through the available program types. In the weekly example shown, the user can enter times and event functions 616 and 620 for each day selected (as shown by an X in the block under the specified day) in the set of blocks 630, with the current day's schedule being identified by highlighting the particular block corresponding to the day—in this case Sunday. A set of control arrows 640 can also be used to set a particular date for date oriented schedules. In this example, 18 actions are identified to take place at 18 different times on Sunday for a weekly program. Other interfaces can also be used to carry out programming actions. A screen such as 600 is suitable for use when the program is stored at the TV, where a sequence of similar operations can be cycled through at a remote control to implement the programming. If two-way communication is available between the TV receiver device and the remote controller 110, then the RC 110 can be used to display selections stored in the RC 110 via the television display 340. Many other variations will occur to those skilled in the art after consideration of the present teachings.

Thus, a method of simulating use of a television consistent with certain implementations of the present invention involves switching a television remote controller or a television set to an operational mode in which a simulating function is activated. While in the simulating function is activated, the television receiver device is operated in a manner which to simulates operations that a user performs when using the television receiver device by changing operation at scheduled times, programmed times, random times or random time intervals.

A method of simulating use of a television may involve switching a television remote controller to an operational mode in which a simulating function is activated; while in the simulating function is activated, sending commands from the remote controller to a television receiver device in order to simulate operations that a user performs when using the television receiver device; and where sending commands includes sending commands at scheduled times, random times or random time intervals, recalling that a television receiver device may include a television set, a television remote controller or any other device capable of receiving television programming.

In certain implementations, sending commands includes sending commands that turn the television receiver device off and on. In certain implementations, sending commands involves sending commands that change tuned television channel. In certain implementations, sending commands involves sending commands that display on-screen-display or menu functions. In certain implementations, sending commands involves sending commands that change audio volume levels. In certain implementations, commands are sent at scheduled times, and where the scheduled times and associated commands are user programmed. In certain implementations, the commands are selected at random and are sent at random times. In certain implementations, content that simulates received content displayed by the television comes from a local storage medium. In certain implementations, the television receiver device comprises a television set. In certain implementations, the television receiver device comprises a television set top box.

Another method of simulating use of a television receiver device involves switching a television receiver device to an operational mode in which a simulating function is activated. While in the simulating function is activated, the television receiver device simulates operations that a user performs when using the television receiver device. The simulated operations can include operations carried out at scheduled times, programmed times, random times or random time intervals.

In certain implementations, content that simulates received content displayed by the television receiver device comes from a local storage medium. In certain implementations, the operations involve turning the television receiver device off and on. In certain implementations, the operations involve changing a tuned television channel. In certain implementations, the operations involve displaying on-screen-display or menu functions. In certain implementations, the operations involve changing audio volume levels. In certain implementations, the operations are carried out at scheduled times, and where the scheduled times and associated commands are user programmed. In certain implementations, the commands are selected at random and are sent at random times.

Any of these methods can be carried out using a storage medium such as a non-transitory computer readable storage medium storing instructions which, when executed on one or more programmed processors, carry out one or more of the methods described above.

A remote controller device consistent with certain implementations include a user interface that receives user commands. A transmitter transmits commands for receipt by a television receiver device. A processor processes user commands that control a television receiver device. The processor switches the television remote controller to an operational mode in which a simulating function is activated upon receipt of a corresponding user command. While in the simulating function is activated, the processor causes the transmitter to transmit commands from the remote controller in order to simulate operations that a user performs when using the television receiver device. Transmitting commands can include transmitting commands at scheduled times, programmed times, random times or random time intervals.

In certain implementations, transmitting commands comprises transmitting commands that turn the television receiver device or a portion thereof off and on. In certain implementations, transmitting commands includes transmitting commands that change tuned television channel. In certain implementations, transmitting commands involves transmitting commands that display on-screen-display or menu functions. In certain implementations, transmitting commands comprise transmitting commands that change audio volume levels. In certain implementations, commands are transmitted at scheduled times, and where the scheduled times and associated commands are user programmed. In certain implementations, the commands are selected at random and are sent at random times.

A television receiver device consistent with certain implementations has a user interface that receives user commands. A processor processes user commands that control the television receiver device. The processor switches the television receiver device to an operational mode in which a simulating function is activated upon receipt of a corresponding user command. While the simulating function is activated, the processor causes the television receiver device to operate in a mode that simulates operations that a user performs when using the television receiver device. In the mode that simulates operations that a user performs, the operations can be carried out at scheduled times, programmed times, random times or random time intervals.

In certain implementations, content that simulates received content displayed by the television receiver device comes from a local storage medium. In certain implementations, the operations can include turning the television receiver device or a portion thereof off and on. In certain implementations, the operations include changing a tuned television channel. In certain implementations, the operations include displaying an on-screen-display or menu. In certain implementations, the operations include changing audio volume levels. In certain implementations, the operations are carried out at scheduled times, and where the scheduled times and associated operations are user programmed. In certain implementations, the commands are selected and carried out at random times.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium such as a non-transitory storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of simulating use of a television, comprising:
    switching a television remote controller to an operational mode in which a simulating function is activated;
    while the simulating function is activated, sending commands from the remote controller to a television receiver device in order to simulate operations that a user performs when using the television receiver device, where sending commands comprises sending commands that turn the television receiver device off and on; and
    where sending commands includes sending commands at scheduled times, programmed times, random times or random time intervals.

2. The method according to claim 1, where sending commands further comprises sending commands that change tuned television channel.

3. The method according to claim 1, where sending commands further comprises sending commands that display on-screen-display or menu functions.

4. The method according to claim 1, where sending commands further comprises sending commands that change audio volume levels.

5. The method according to claim 1, where commands are sent at scheduled times, and where the scheduled times and associated commands are user programmed.

6. The method according to claim 1, where the commands are selected at random and are sent at random times.

7. The method according to claim 1, where content that simulates received content displayed by the television comes from a local storage medium.

8. A non-transitory computer readable storage medium storing instructions which, when executed on one or more programmed processors, carry out a method according to claim 1.

9. The method according to claim 1, where the television receiver device comprises a television set.

10. The method according to claim 1, where the television receiver device comprises a television set top box.

11. A remote controller device, comprising:
    a user interface that receives user commands;
    a transmitter that transmits commands for receipt by a television receiver device;
    a processor that processes user commands that control a television receiver device;
    the processor switching the television remote controller to an operational mode in which a simulating function is activated upon receipt of a corresponding user command;
    while the simulating function is activated, the processor causing the transmitter to transmit commands from the remote controller in order to simulate operations that a user performs when using the television receiver device, where the transmitter transmits commands that comprise at least commands that turn the television receiver device or a portion thereof off and on; and
    where transmitting commands includes transmitting commands at scheduled times, programmed times, random times or random time intervals.

12. The device according to claim 11, where transmitting commands further comprises transmitting commands that change tuned television channel.

13. The device according to claim 11, where transmitting commands further comprises transmitting commands that display on-screen-display or menu functions.

14. The device according to claim 11, where transmitting commands further comprises transmitting commands that change audio volume levels.

15. The device according to claim 11, where commands are transmitted at scheduled times, and where the scheduled times and associated commands are user programmed.

16. The device according to claim 11, where the commands are selected at random and are sent at random times.

* * * * *